United States Patent
Kondo et al.

[11] Patent Number: 6,116,785
[45] Date of Patent: Sep. 12, 2000

[54] SELF-ALIGNING ROLLER BEARING

[75] Inventors: Yukihiro Kondo; Yukimitsu Yamamoto; Takeshi Maeda, all of Mie, Japan

[73] Assignee: NTN Corporation, Osaka, Japan

[21] Appl. No.: 09/177,084

[22] Filed: Oct. 23, 1998

[30] Foreign Application Priority Data

Oct. 29, 1997 [JP] Japan ................... 9-296883
Aug. 11, 1998 [JP] Japan ................... 10-226810

[51] Int. Cl.⁷ .................................... F16C 23/08
[52] U.S. Cl. ................... 384/463; 384/558; 384/568; 384/571; 384/572
[58] Field of Search ................... 384/463, 558, 384/568, 571, 575, 572

[56] References Cited

U.S. PATENT DOCUMENTS 4,534,871 8/1985 Johnson .................. 384/463
5,615,956 4/1997 Oba et al. ................ 384/463

*Primary Examiner*—Lenard A. Footland
*Attorney, Agent, or Firm*—Wenderoth, Lind & Ponack, L.L.P.

[57] ABSTRACT

A solid lubrication type self-aligning roller bearing is low in frictional torque and high in high-speed rotation performance. Only the space between fingers of the retainer protruding into the spaces between the outer ring and adjacent rollers arranged in two rows is filled with a lubricating composition manufactured by solidifying a mixture of an ultra-high-molecular-weight polyolefin and a grease to reduce the number of contact portions of the solid lubricating composition with the outer ring and the rollers. It is thus possible to considerably reduce torque and heat buildup due to sliding friction at the contact portions.

5 Claims, 6 Drawing Sheets

PRIOR ART

SELF-ALIGNING ROLLER BEARING

BACKGROUND OF THE INVENTION

This invention relates to a self-aligning roller bearing in which a solid lubricant is filled.

A self-aligning roller bearing has a self-aligning function. Namely, its rollers and inner ring can rotate inclined to a certain degree with respect to the axis of the outer ring. Such a self-aligning roller bearing is used in situations where the inner and outer rings tend to incline relative to each other due to mounting error of the shaft to the housing, or deflection of the shaft, and is characterized by its high resistance to vibrations and impact loads.

FIGS. 6A and 6B show a typical self-aligning roller bearing, which comprises an inner ring 21 formed with two raceways 22, an outer ring 23 formed with a spherical raceway 24, and barrel-shaped rollers 25 arranged between the raceways 22 and 24 in two rows. A retainer 26 is provided between the rows of rollers 25 and has fingers 27 protruding into spaces between the adjacent rollers 25 in each row.

The self-aligning roller bearing shown in FIGS. 6A and 6B is used in an environment in which pollution by leaked grease is not permitted. Every space and gap in the bearing is filled with a solid lubricating composition 28. The solid lubricating composition 28 is manufactured by hardening a liquid mixture comprising 5–99 wt % of an ultra-high-molecular-weight polyolefin powder having a particle diameter ranging from 1 to 100 μm and an average molecular weight of $1 \times 10^6$ to $5 \times 10^6$, 1–50 wt % of a solid wax containing a low-molecular-weight polyethylene, and 5–99 wt % of a lithium soap-mineral oil grease by retaining the mixture in a dispersed state at a temperature higher than the gelation point of the ultra-high-molecular-weight polyolefin and not exceeding the dropping point of the mineral grease.

One problem with this type of self-aligning roller bearing is that a large torque is produced due to increased sliding frictional resistance resulting from a large number of contact portions of the inner ring, outer ring and rollers is contact with the solid lubricating composition. During high-speed rotation, the interior of the bearing tends to be heated to a temperature above a permissible level due to sliding frictional resistance. This results in sudden deterioration in high-speed rotation characteristics.

An object of this invention is to provide a solid lubrication type self-aligning roller bearing which is low in frictional torque and high in high-speed rotation characteristics.

SUMMARY OF THE INVENTION

According to this invention, there is provided a self-aligning roller bearing comprising an outer ring, an inner ring, rollers arranged between the outer ring and the inner ring in two rows, and a retainer having fingers protruding into gaps between adjacent ones of the rollers in each row. A space between the outer periphery of the fingers and the inner periphery of the outer ring is filled with a lubricating composition manufactured by solidifying a mixture of an ultra-high-molecular-weight polyolefin and a grease.

By filling only the space between the fingers of the retainer and the outer ring, the number of contact portions of the solid lubricating composition and the bearing parts is reduced to reduce substantially the torque and heat buildup due to sliding friction at the contact portions.

The fluid mixture of the polyolefin and a grease is poured into the space between the retainer fingers and the outer ring, formed by heating, and solidifies by cooling. Since the solidified lubricating composition contains oil, the oil content adheres to the outer surfaces of the rollers, thus lubricating the sliding surfaces of the inner ring and the rollers even though these portions are not filled with the solid lubricating composition. Further, the oil content that has adhered to the roller surfaces will spread onto the raceway of the outer ring at both sides of the fingers of the retainer, even though these portions are not filled with the solid lubricating composition, due to change in inclination angle between the outer ring and the rollers during rotation. Thus, the entire raceways of the outer and inner rings are lubricated.

Preferably, the lubricating composition should fill 30–40% in volume of the entire space in the bearing. If this rate is less than 30%, lubrication will be insufficient. If over 40%, the frictional torque will grow too large.

If the self-aligning roller bearing is used to support rollers provided in a continuous processing line for sheet steel, the rollers can rotate smoothly while withstanding uneven load and vibration that act on the rollers due to meandering and fluttering of sheet metal being fed in the line. Further, since grease is less likely to leak, the sheet steel surface is less likely to be polluted by grease. In the continuous processing line for sheet metal, strips of sheet steel are processed while being fed at high speed. Such lines include a a continuous acid-washing line, continuous annealing line, and a continuous plating line.

Other features and objects of the present invention will become apparent from the following description made with reference to the accompanying drawings, in which:

DETAILED DESCRIPTION OF THE PREFERRED EMBODIMENT

Figure 1A:
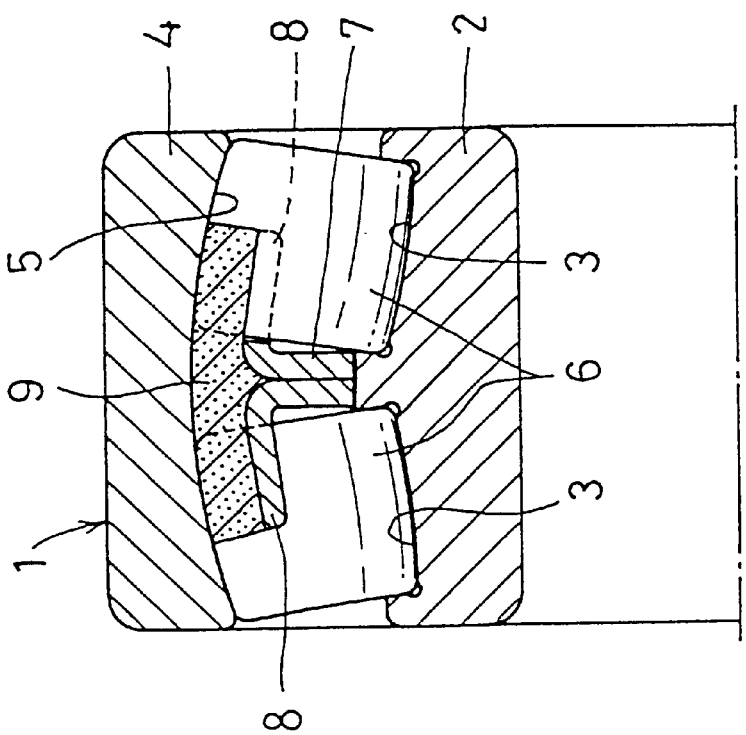
FIG. 1A is a partial vertical sectional view of a self-aligning roller bearing embodying the invention.
Figure 1B:
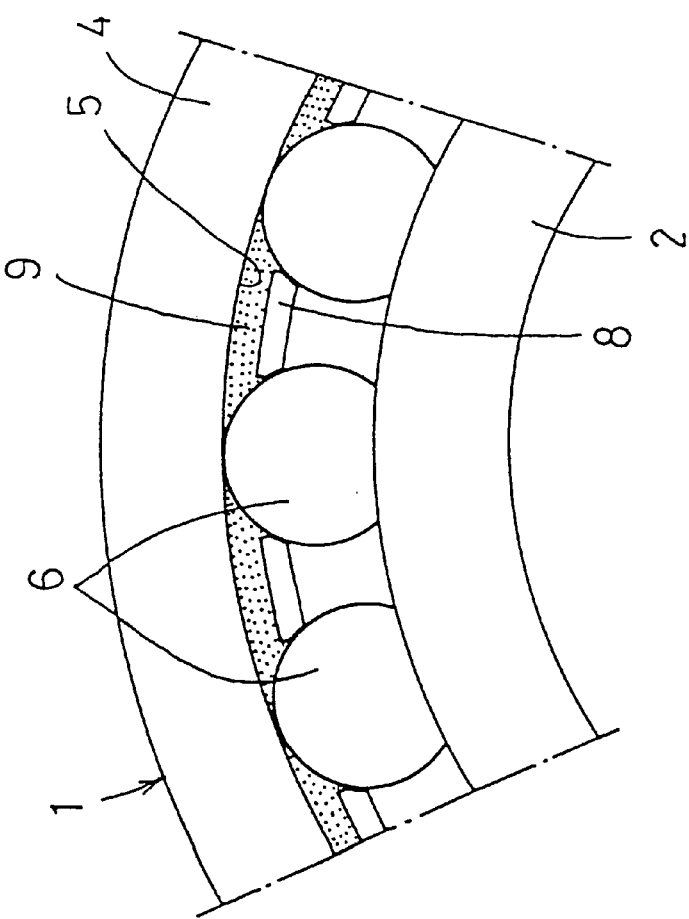
FIG. 1B is a side view of the same.
Figure 2:
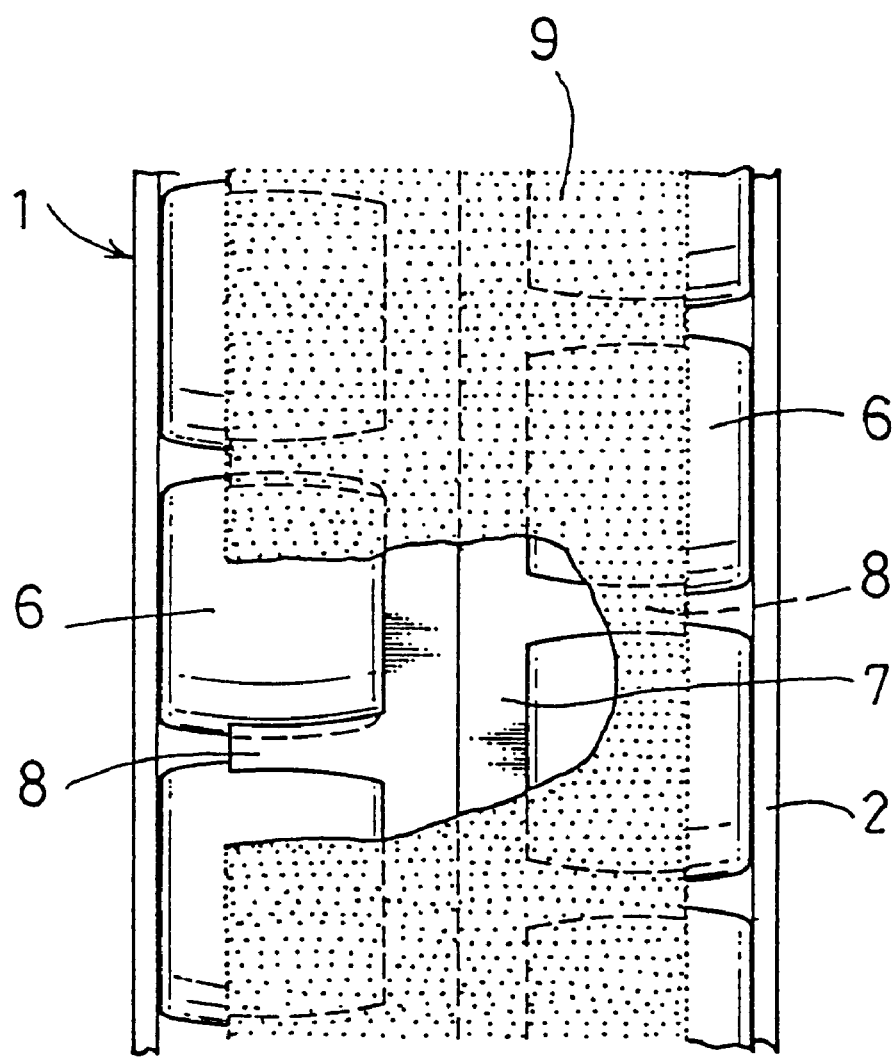
FIG. 2 is a developed plan view of rows of rollers shown in FIGS. 1A and 1B.

Referring now to FIGS. 1A–5, an embodiment of this invention is described. FIGS. 1A, 1B and 2 show a self-aligning roller bearing embodying the invention. As shown in FIGS. 1A and 1B, this self-aligning roller bearing 1 comprises an inner ring 2 formed with two raceways 3, an outer ring 4 formed with a spherical raceway 5, and barrel-shaped rollers 6 disposed between the raceways 3 and 5 in two rows. The rollers 6 in one row are displaced a half pitch from the rollers in the other row as shown in FIG. 2. A retainer 7 has fingers 8 protruding into the gaps between the adjacent rollers 6 in each row in a staggered manner.

The gap between the outer periphery of the fingers 8 and the inner periphery of the outer ring 4 is filled with a solid lubricating composition 9 manufactured by hardening a liquid mixture of 20 wt % of an ultra-high-molecular-weight polyolefin powder having a particle diameter of 30 μm and an average molecular weight of 3×10$^6$, 16 wt % of a solid wax containing a low-molecular-weight polyethylene, and 64 wt % of a lithium soap-mineral oil grease by retaining the mixture in a dispersed state at a temperature not lower than the gelation point of the ultra-high-molecular-weight polyolefin and not exceeding the dropping point of the grease. The solid lubricating composition 9 fills 35%, in volume, of the entire space in the bearing. Its upper allowable temperature limit is 80° C.

Figure 3:
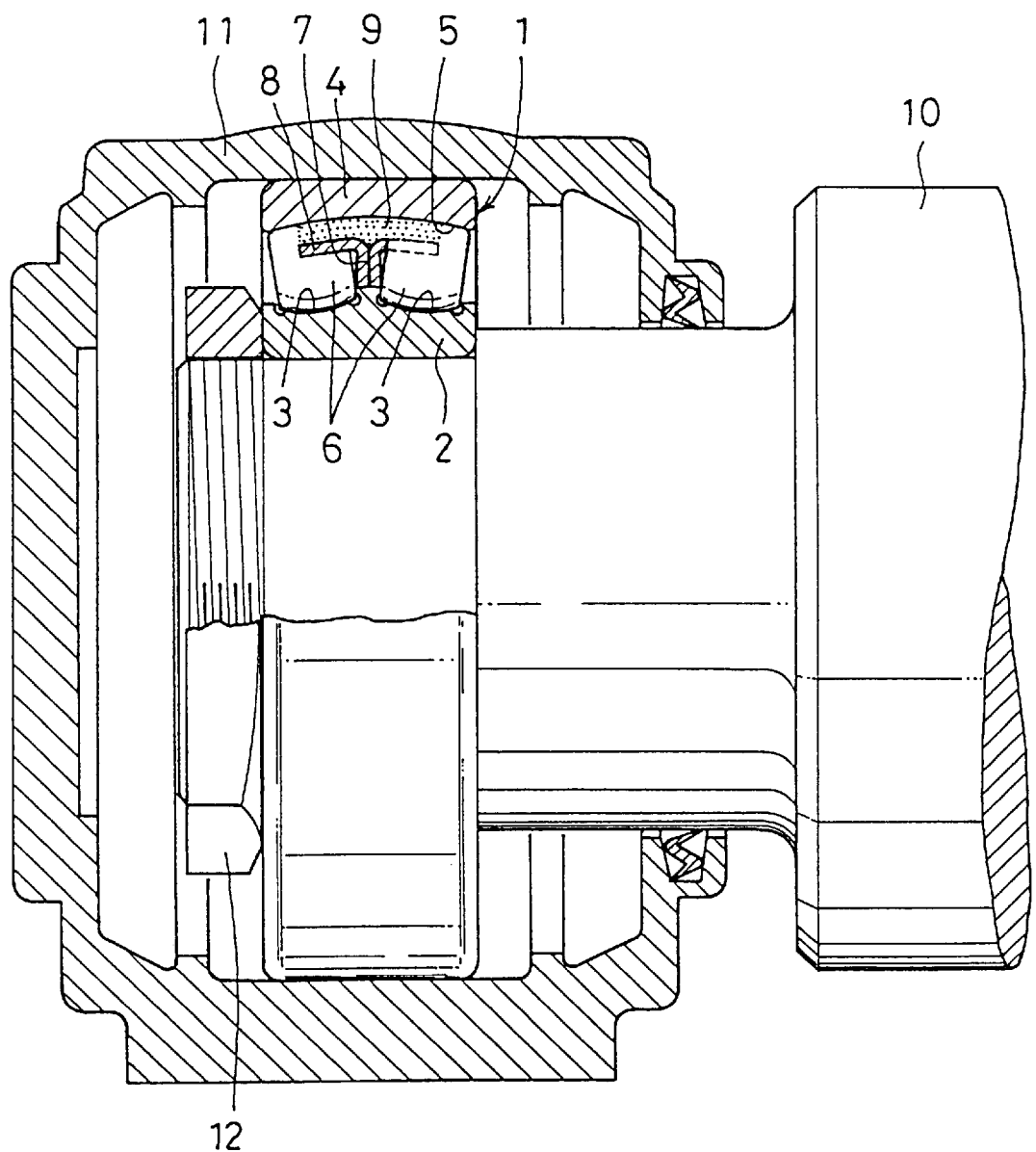
FIG. 3 is a vertical sectional view of the self-aligning roller bearing of FIGS. 1A and 1B as mounted on a deflector roller in a continuous annealing line.

FIG. 3 shows the self-aligning roller bearing 1 as mounted on a deflector roller 10 in a continuous annealing line for sheet steel. The bearing 1 has its inner ring 2 fitted on the end of the roller 10 and its outer ring 4 fixed to the inner surface of a bearing box 11 comprising two split halves, and is restrained from coming off by a nut 12.

Examples and Comparative Examples are now described.

EXAMPLE

A self-aligning roller bearing of the type shown in FIGS. 1A and 1B was manufactured which had an inner diameter of 80 mm, an outer diameter of 140 mm and a width of 33 mm.

COMPARATIVE EXAMPLE

Figure 6A:
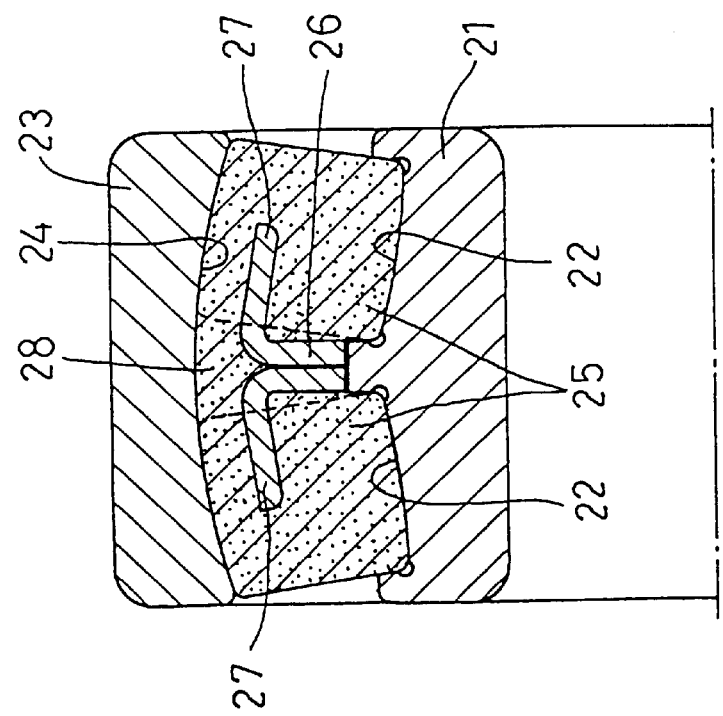
FIG. 6A is a partial vertical sectional view of a conventional self-aligning roller bearing.
Figure 6B:
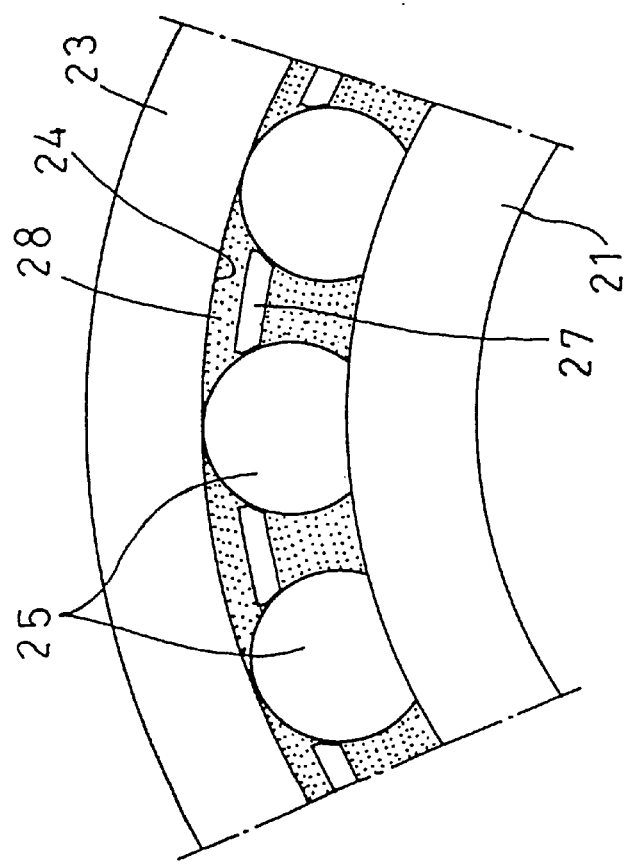
FIG. 6B is a side view of the same.

A self-aligning roller bearing was provided with the same dimensions as the above Example and with its entire inner space completely filled up with a solid lubricating composition as shown in FIG. 6.

The self-aligning roller bearings of the Example and the Comparative Example were mounted on a shaft for a high-speed rotation test. In the test, the number n of samples was set at 2 for both the Example and the Comparative Example, and the rotation torque and the temperature of the shaft portion were measured while gradually increasing the rotating speed of the shaft.

Figure 4:
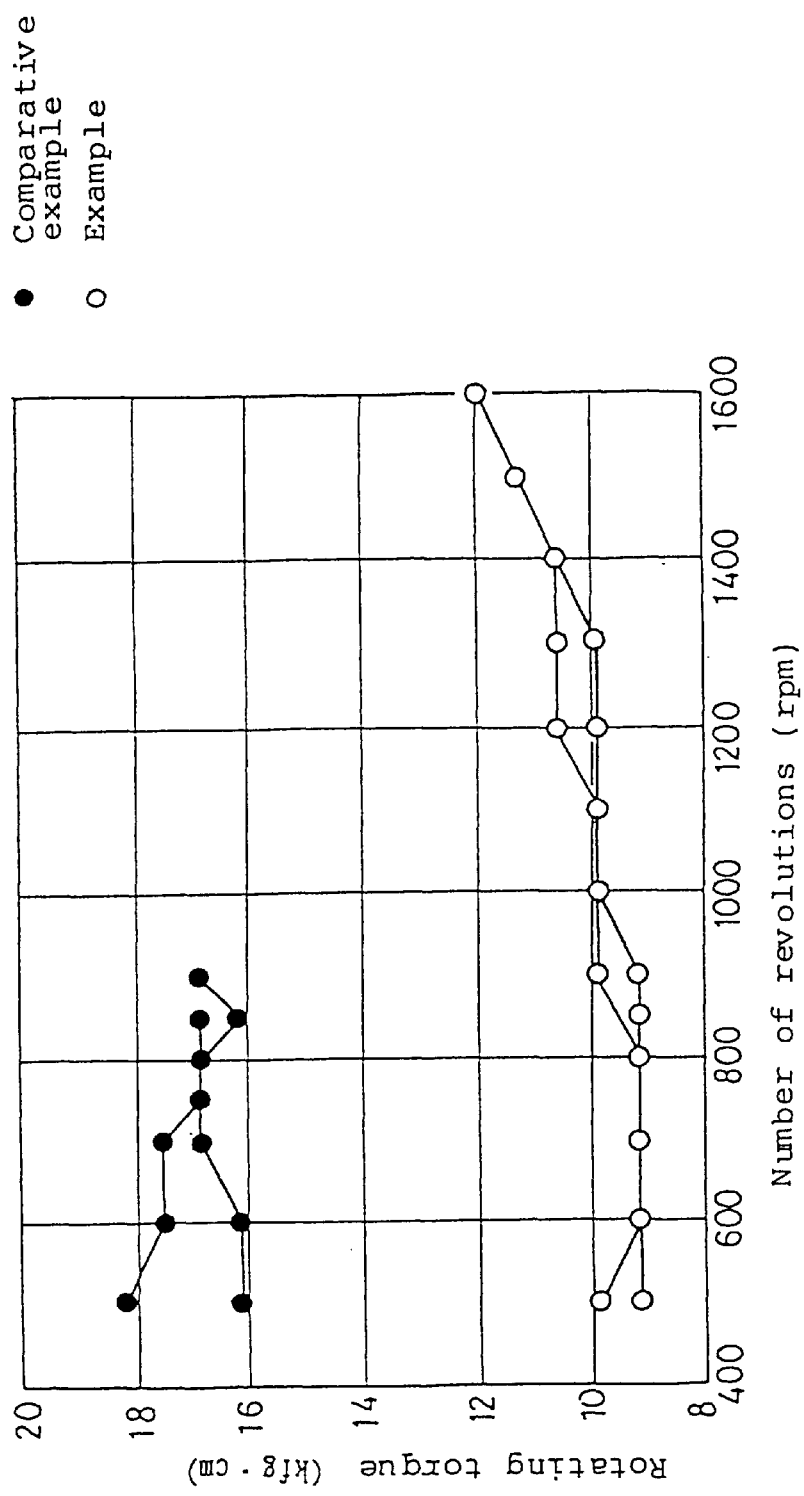
FIG. 4 is a graph comparing the rotation torque of an Example according to the invention with that of Comparative Example.

FIG. 4 shows the results of the measurement of rotation torque. Compared with the Comparative Example, the self-aligning roller bearing of the Example was about half in rotation torque. This is considered to be due to the reduced number of contact portions of the solid lubricating composition with the bearing parts and the resulting reduction in the sliding frictional resistance.

Figure 5:
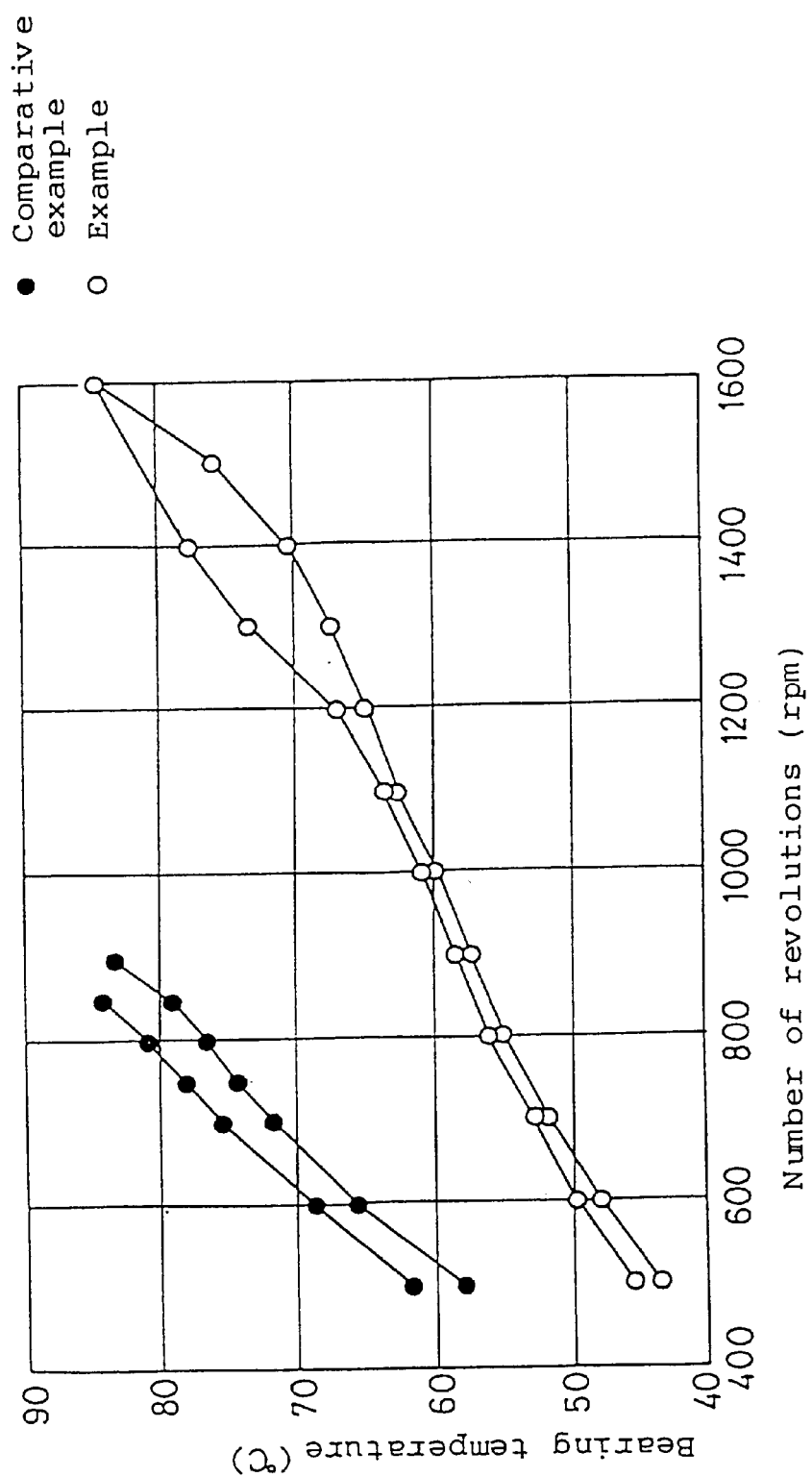
FIG. 5 is a graph showing the temperature rise of a shaft portion.

FIG. 5 shows the results of temperature measurements of the shaft portion. In the Comparative Example, heat buildup was remarkable due to sliding friction, and the shaft portion was heated to over 80° C., which is the upper permissible use temperature, at 800 rpm. In the Example, the temperature was within the permissible range up to around 1600 rpm. The high-speed rotation performance was thus excellent.

In the self-aligning roller bearing according to this invention, only the space between the fingers of the retainer and the outer ring is filled with a lubricating composition manufactured by solidifying a mixture of an ultra-high-molecular-weight polyolefin and a grease to reduce the number of contact portions of the solid lubricating composition with the bearing parts. It is thus possible to significantly reduce torque and heat buildup due to frictional resistance at the contact portions. This improves the high-speed rotation performance.

What is claimed is:

1. A self-aligning roller bearing comprising an outer ring, an inner ring, rollers arranged between said outer ring and said inner ring in two rows, and a retainer having fingers protruding into gaps between adjacent ones of said rollers in each row, characterized in that only a space between the outer periphery of said fingers and the inner periphery of said outer ring is filled with a lubricating composition manufactured by solidifying a mixture of an ultra-high-molecular-weight polyolefin and a grease.

2. A self-aligning roller bearing as claimed in claim 1 wherein said lubricating composition fills 30–40% in volume of the entire space in the bearing.

3. A self-aligning roller bearing as claimed in claim 1 wherein, said bearing is used to support a roller provided in a continuous processing line for sheet steel.

4. A self-aligning roller bearing as claimed in claim 2 wherein said bearing is used to support a roller provided in a continuous processing line for sheet steel.

5. A self-aligning roller bearing comprising an outer ring, an inner ring, rollers arranged between said outer ring and said inner ring in two rows, and a retainer having fingers protruding into gaps between adjacent ones of said rollers in each row, characterized in that a space between the outer periphery of said fingers and the inner periphery of said outer ring is filled with a lubricating composition manufactured by solidifying a mixture of an ultra-high-molecular-weight polyolefin and a grease, said lubricating composition filling no more than 40% of the entire space in the bearing.

\* \* \* \* \*